(12) United States Patent
Drees

(10) Patent No.: US 11,745,633 B2
(45) Date of Patent: Sep. 5, 2023

(54) BEVERAGE DISPENSING SYSTEM FOR A MOTOR VEHICLE

(71) Applicant: KOSTAL Automobil Elektrik GmbH & Co. KG, Luedenscheid (DE)

(72) Inventor: Roland Drees, Boenen (DE)

(73) Assignee: Kostal Automobil Elektrik GmbH & Co. KG, Luedenscheid (DE)

( * ) Notice: Subject to any disclaimer, the term of this patent is extended or adjusted under 35 U.S.C. 154(b) by 32 days.

(21) Appl. No.: 17/592,035

(22) Filed: Feb. 3, 2022

(65) Prior Publication Data
US 2022/0153179 A1     May 19, 2022

Related U.S. Application Data

(63) Continuation of application No. PCT/EP2020/071970, filed on Aug. 5, 2020.

(30) Foreign Application Priority Data

Aug. 9, 2019    (DE) .................. 10 2019 005 627.2

(51) Int. Cl.
*B60N 3/18*      (2006.01)
*A47G 19/22*      (2006.01)
*B67D 1/00*      (2006.01)

(52) U.S. Cl.
CPC ........... *B60N 3/18* (2013.01); *A47G 19/2205* (2013.01); *B67D 1/0004* (2013.01); *B67D 2210/00065* (2013.01); *B67D 2210/00136* (2013.01)

(58) Field of Classification Search
CPC ........ B67D 1/10; B67D 1/124; B67D 1/0004; B67D 1/0894; B67D 1/0804; B67D 2001/0812; B05B 11/00446
(Continued)

(56) References Cited

U.S. PATENT DOCUMENTS 3,955,720 A * 5/1976 Malone ................. B05B 9/0822
                                                    222/401
4,877,065 A * 10/1989 Lamboy ................... B65B 3/16
                                                    141/319
(Continued)

FOREIGN PATENT DOCUMENTS

CH          702947 A2     10/2011
CN          1417057 A      5/2003
(Continued)

OTHER PUBLICATIONS

The International Bureau of WIPO, International Preliminary Report on Patentability for International Application No. PCT/EP2020/071970 dated Feb. 8, 2022.
(Continued)

*Primary Examiner* — Timothy L Maust
(74) *Attorney, Agent, or Firm* — Brooks Kushman P.C.

(57) ABSTRACT

A beverage dispensing system for a vehicle includes a beverage dispenser and a drinking vessel. The beverage dispenser includes a nozzle having an upwardly directed nozzle tube for dispensing a beverage liquid. The drinking vessel is connectable to the nozzle tube and is fillable with the beverage liquid from a bottom side of the drinking vessel. The drinking vessel has a hollow dome which is opened on its bottom and top sides and is formed by a central section of the bottom side of the drinking vessel extending into the drinking vessel interior. The hollow dome is pushed onto the nozzle tube for the drinking vessel to be filled with the beverage liquid from its bottom side. The drinking vessel may be a cylindrical or truncated conical mug in which the central section of its bottom side is curved into the drinking vessel interior to form the hollow dome.

19 Claims, 2 Drawing Sheets

(58) Field of Classification Search
USPC .............................................. 141/113; 215/2
See application file for complete search history.

(56) References Cited

U.S. PATENT DOCUMENTS

| | | | | |
|---|---|---|---|---|
| 5,209,379 | A * | 5/1993 | Dahlin | B05B 9/0822 222/402.1 |
| 5,411,183 | A * | 5/1995 | Hildebrandt | B05B 9/0822 222/400.7 |
| 7,708,035 | B2 * | 5/2010 | Windmiller | B65D 47/248 220/709 |
| 8,777,182 | B2 * | 7/2014 | Springer | A47G 19/2205 137/499 |
| 8,899,281 | B2 * | 12/2014 | Russell | B67D 1/04 141/113 |
| 9,016,333 | B2 * | 4/2015 | Shaffer | B67D 1/1272 141/113 |
| 9,517,923 | B2 * | 12/2016 | Al-Hakim | B67D 1/10 |
| 10,420,355 | B2 * | 9/2019 | Vulpitta | B67D 1/108 |
| 11,066,286 | B1 * | 7/2021 | Mullenaux | A47C 19/022 |
| 2008/0223478 | A1 * | 9/2008 | Hantsoo | B67D 1/0894 141/2 |
| 2010/0237033 | A1 * | 9/2010 | Windmiller | B67C 3/2637 215/2 |
| 2011/0240170 | A1 * | 10/2011 | Fallon | B67D 1/1272 220/601 |
| 2012/0103926 | A1 * | 5/2012 | Ibsies | B65D 1/06 141/113 |
| 2014/0004241 | A1 * | 1/2014 | Hatherell | B65B 31/025 261/150 |
| 2014/0182744 | A1 * | 7/2014 | Shaffer | B67D 1/0894 222/181.1 |
| 2016/0096716 | A1 | 4/2016 | Al-Hakim | |

FOREIGN PATENT DOCUMENTS

| | | | |
|---|---|---|---|
| DE | 102009012055 A1 | 9/2010 | |
| EP | 1386880 A1 * | 2/2004 | .......... B67D 1/0005 |
| EP | 2957504 B1 | 4/2017 | |
| WO | 2016071880 A1 | 5/2016 | |

OTHER PUBLICATIONS

European Patent Office, International Search Report for International Application No. PCT/EP2020/071970, dated Oct. 15, 2020.
German Patent and Trademark Office, German Search Report for corresponding German Patent Application No. DE 10 2019 005 627.2, dated Apr. 1, 2020.

* cited by examiner

BEVERAGE DISPENSING SYSTEM FOR A MOTOR VEHICLE

CROSS-REFERENCE TO RELATED APPLICATIONS

This application is a continuation of International Application No. PCT/EP2020/071970, published in German, with an international filing date of Aug. 5, 2020, which claims priority to DE 10 2019 005 627.2, filed Aug. 9, 2019, the disclosures of which are hereby incorporated in their entirety by reference herein.

TECHNICAL FIELD

The present invention relates to a beverage dispensing system for a motor vehicle, the beverage dispensing system including a beverage dispenser and a drinking vessel, the beverage dispenser having an upwardly directed nozzle tube for dispensing a beverage liquid, and the drinking vessel being connectable to the nozzle tube of the beverage dispenser for being fillable with the beverage liquid from the bottom side of the drinking vessel.

BACKGROUND

Beverage dispensers, integrated into motor vehicles, for dispensing a beverage such as coffee typically have an outlet beneath which a drinking vessel may be placed. The beverage from the beverage dispenser flows out of the outlet and into the drinking vessel from above. The drinking vessel may be a mug or a cup. Placing the drinking vessel on a standing surface (e.g., a shelf) exactly beneath the outlet of the beverage dispenser requires a certain level of visual attentiveness. If the placement is made by the driver of the vehicle while traveling, then the driver may be momentarily distracted from traffic activity, which represents a safety risk.

A beverage dispensing system is known from European Patent EP 2 957 504 B1 (corresponding to U.S. Pat. No. 8,763,655), in which a drinking vessel may be filled from its bottom side (i.e., its underside). The drinking vessel has a magnetic closure assembly that automatically closes the drinking vessel after the drinking vessel is removed from the beverage dispenser. Such a drinking vessel is quite complicated mechanically. As such, this type of mechanism represents a significant cost factor, especially when disposable drinking vessels are to be used.

SUMMARY

An object is a beverage dispensing system that avoids the above-mentioned disadvantages.

In embodiments, a beverage dispensing system for a motor vehicle includes a beverage dispenser and a drinking vessel. The beverage dispenser has a nozzle tube for dispensing a beverage liquid. The nozzle tube of the beverage dispenser is directed upwards. The drinking vessel is connectable to the nozzle tube of the beverage dispenser. When the drinking vessel is connected to the nozzle tube of the beverage dispenser, the drinking vessel can be filled with the beverage liquid from the bottom side of the drinking vessel. The drinking vessel is an approximately cylindrical or frustoconical mug or cup, in which a central section of the bottom side of the drinking vessel is curved into a central portion of the interior of the drinking vessel and forms a hollow dome open on its top and bottom sides. The drinking vessel is connected to the nozzle tube of the beverage dispenser by the hollow dome of the drinking vessel being pushed onto the nozzle tube. That is, the hollow dome of the drinking vessel is pushed onto the nozzle tube of the beverage dispenser to fill the drinking vessel with the beverage liquid from the beverage dispenser. Correspondingly, the nozzle tube is inserted into the hollow dome.

Embodiments of the present invention achieve the above object in that the drinking vessel is an approximately cylindrical or truncated conical (cone-shaped) mug or cup in which a central section of the bottom side of the drinking vessel is curved into the interior of the drinking vessel and forms a hollow dome which is open on both top and bottom sides, and the hollow dome is pushed or placed onto the nozzle tube of the beverage dispenser in order to fill the drinking vessel with beverage liquid from the beverage dispenser.

A beverage dispensing system in accordance with embodiments of the present invention allows the beverage dispenser and the drinking vessel to be fitted or joined together, even without particular visual attentiveness, as the nozzle tube of the beverage dispenser may be easily inserted into the hollow dome of the drinking vessel. The nozzle tube is cylindrically or conically shaped to easily insert into the correspondingly shaped hollow dome of the drinking vessel.

The drinking vessel may then slide under its own weight into the correct filling position on the beverage dispenser.

As a result of the nozzle tube engaging with the hollow dome of the drinking vessel in a form-fit manner, the drinking vessel rests very stably on the beverage dispenser. This is particularly advantageous with regard to braking and acceleration forces occurring in a vehicle.

The drinking vessel may be made of any desired material, in particular metal or porcelain. The drinking vessel is also manufacturable cost-effectively in a disposable version made of cardboard or plastic.

The shape of the drinking vessel corresponds approximately to the shape of a relatively narrow but relatively tall ring cake mold. However, the central hollow dome of the drinking vessel does not extend to the height of the outer wall of the drinking vessel.

The drinking vessel may be filled with beverage liquid to just below a free open-end section of the hollow dome. After the drinking vessel is removed from the nozzle tube of the beverage dispenser, no beverage liquid flows through the hollow dome opening. That is, after the drinking vessel is removed from the beverage dispenser, no beverage liquid in the drinking vessel flows through the hollow dome opening since the level of the beverage liquid in the drinking vessel does not reach the opening in the hollow dome. Further, the level of the beverage liquid in the drinking vessel does not reach the opening in the hollow dome even when the drinking vessel is tilted. Accordingly, even when the drinking vessel is tilted while a user is drinking the beverage liquid from the drinking vessel, no beverage liquid in the drinking vessel flows through the hollow dome opening. The shape of the drinking vessel is thus inherently leakproof, also without a complicated valve mechanism.

BRIEF DESCRIPTION OF THE DRAWINGS

An exemplary embodiment of a beverage dispensing system in accordance with the present invention is illustrated and explained below with reference to the drawings, which include the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
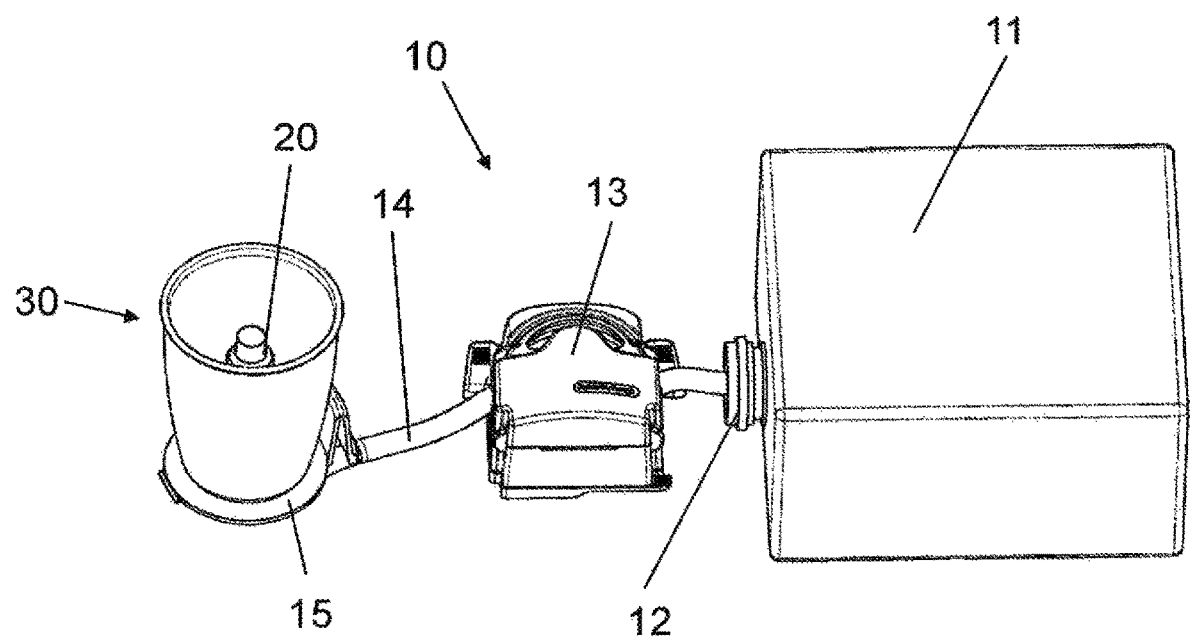
FIG. 1 illustrates the beverage dispensing system, the beverage dispensing system having a beverage dispenser and a drinking vessel.

Referring now to FIG. 1, a beverage dispensing system in accordance with an exemplary embodiment of the present invention is shown. The beverage dispensing system includes a beverage dispenser 10 and a drinking vessel 30. Drinking vessel 30 is connectable to beverage dispenser 10 for the drinking vessel to be filled with beverage liquid from the beverage dispenser. In FIG. 1, drinking vessel 30 is connected to beverage dispenser 10.

Beverage dispenser 10 includes a storage container 11. Storage container 11 may contain water or any other desired beverage liquid 40 (shown in FIG. 4). After beverage liquid 40 is emptied from storage container 11, the storage container may either be refilled or replaced with a new storage container.

Beverage dispenser 10 further includes a nozzle 20. Beverage liquid 40 from storage container 11 may be dispensed into drinking vessel 30 via nozzle 20. A tube or hose 14 of beverage dispenser 10 is connected at one end to nozzle 20 and is connected at another end to a tube or hose connection 12 of storage container 11. Nozzle 20 is thereby connected to storage container 11 through tube 14. Consequently, beverage liquid 40 may be supplied through tube 14 from storage container 11 to nozzle 20.

Beverage dispenser 10 further includes an electric pump 13. For filling drinking vessel 30, beverage liquid 40 is conveyed through tube 14 from storage container 11 to nozzle 20 by use of pump 13. Pump 13 may be advantageously designed as a peristaltic pump since beverage liquid 40 does not come into direct contact with the pump mechanism.

A feature of the beverage dispensing system is that drinking vessel 30 is filled with beverage liquid from below (i.e., from its bottom side, bottom surface, or underside), and in particular without the need for a special valve or closure mechanism.

Figure 2:
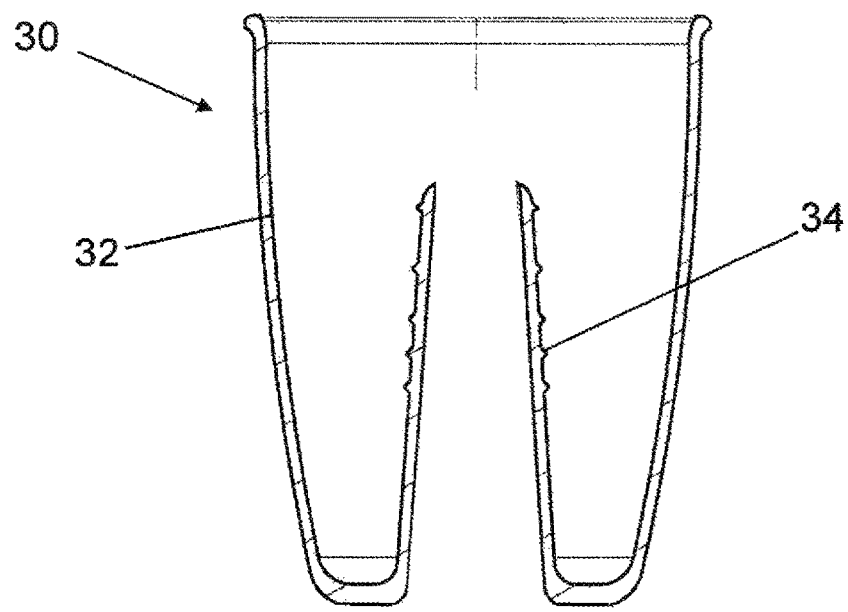
FIG. 2 illustrates a sectional view of the drinking vessel taken alone.

Referring now to FIG. 2, with continual reference to FIG. 1, a sectional view of drinking vessel 30 taken alone is shown. Drinking vessel 30 is suitable for being filled with beverage liquid 40 from the bottom side of the drinking vessel. As shown in FIG. 2, drinking vessel 30 has the customary external shape of a cup or a mug. Drinking vessel 30 includes a tubular, hollow dome 34. Hollow dome 34 extends in one piece from the bottom side of drinking vessel 30 into a central portion of the interior of drinking vessel 30. Hollow dome 34 may have a cylindrical shape, or as illustrated in FIG. 2, may taper conically toward its free end section. Drinking vessel 30 thus has a connection from its bottom side to its interior.

The height of hollow dome 34 relative to an outer wall 32 of drinking vessel 30 should not be too small in order to allow drinking vessel 30 to be filled sufficiently with beverage liquid 40. As described below with reference to FIGS. 3 and 4, for filling drinking vessel 30 with beverage liquid 40 from beverage dispenser 10, a nozzle head 23 of nozzle 20 is introduced into drinking vessel 30. Nozzle head 23 protrudes beyond or above hollow dome 34 of drinking vessel 30 but not beyond or above outer wall 32 of drinking vessel 30. Therefore, the height of hollow dome 34 of drinking vessel 30, as shown in FIG. 2, is preferably approximately three-fourths the height of outer wall 32 of drinking vessel 30.

Figure 3:
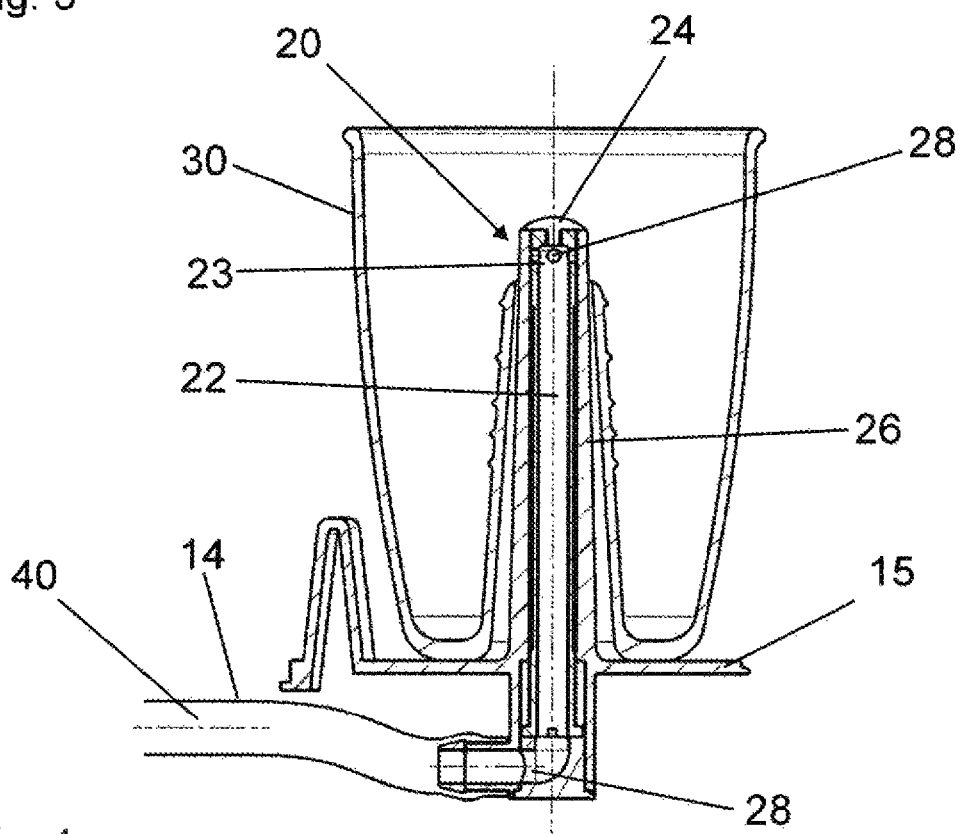
FIG. 3 illustrates a sectional view of the beverage dispenser and the drinking vessel with the drinking vessel being connected in a first nozzle tube position to the beverage dispenser.
Figure 4:
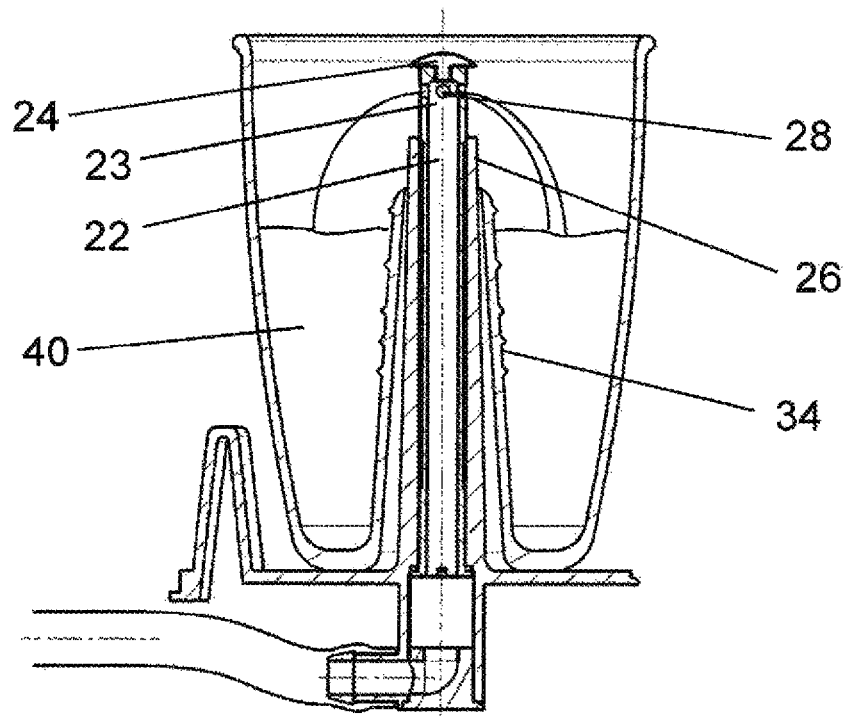
FIG. 4 illustrates a sectional view of the beverage dispenser and the drinking vessel with the drinking vessel being connected in a second nozzle tube position to the beverage dispenser.

Referring now to FIGS. 3 and 4, with continual reference to FIGS. 1 and 2, respective sectional views of beverage dispenser 10 and drinking vessel 30 with the drinking vessel being connected to the beverage dispenser are shown. In FIG. 3, drinking vessel 30 is connected to beverage dispenser 10 in a first nozzle tube position. In FIG. 4, drinking vessel 30 is connected to beverage dispenser 10 in a second nozzle tube position.

FIGS. 3 and 4 explain the filling of drinking vessel 30 with beverage liquid 40 from beverage dispenser 10. For beverage dispenser 10 to fill drinking vessel 30 with beverage liquid 40, drinking vessel 30 is slid over nozzle 20. Nozzle 20 has a nozzle tube 22, which at its free end forms nozzle head 23 of nozzle 20. Nozzle head 23 has multiple nozzle openings 28.

As shown in FIGS. 3 and 4, beverage dispenser 10 further includes a standing surface (or shelf or floor) 15 and a standpipe 26. (Standing surface 15 is also shown in FIG. 1.) Standing surface 15 is configured to support the bottom side of drinking vessel 30 thereon. Standpipe 26 is connected to standing surface 15 and is molded in one piece to standing surface 15. Standpipe 26 extends upward from standing surface 15 in the vertical direction.

With drinking vessel 30 being slid over nozzle 20, nozzle tube 22 is displaceably situated in standpipe 26. Standpipe 26 at its bottom side is connected to tube 14. As such, beverage liquid 40 may be pumped from storage container 11 through tube 14 into standpipe 26 and thus also into nozzle tube 22.

When drinking vessel 30 is set in place, standpipe 26 is inserted into hollow dome 34 of the drinking vessel and extends above the free end section of hollow dome 34. The inner surface of the upper portion of hollow dome 34 rests sealingly against standpipe 26 in a liquid-tight manner. As a result, beverage liquid 40 is prevented from leaking through the opening in hollow dome 34 during filling of drinking vessel 30.

Due to the liquid pressure generated by pump 13, nozzle tube 22 situated in standpipe 26 is lifted. As a result, nozzle head 23 protrudes from standpipe 26 and beverage liquid 40 may emerge out of nozzle openings 28 in nozzle head 23 and fill drinking vessel 30 (FIG. 4). Drinking vessel 30 may be filled just up to the height of hollow dome 34.

If the liquid pressure is discontinued by switching off pump 13, then nozzle tube 22 due to its intrinsic weight drops downwardly in standpipe 26. As a result, nozzle head 23 retracts into standpipe 26, and a nozzle cap 24 situated above nozzle head 23 closes the opening of standpipe 26 (FIG. 3).

After filling, drinking vessel 30 may be pulled off nozzle 20 and used for its intended purpose of drinking. The liquid level of beverage liquid 40 contained in drinking vessel 30 remains below the level of the free end section of hollow dome 34 inside drinking vessel 30, even when drinking vessel 30 is tilted, so that despite its specialized shape, drinking vessel 30 may be used as a conventional mug or cup for drinking.

REFERENCE NUMERALS 10 beverage dispenser
11 storage container
12 tube or hose connection
13 pump
14 tube or hose
15 standing surface, shelf, or floor
20 nozzle
22 nozzle tube
23 nozzle head
24 nozzle cap
26 standpipe
28 nozzle openings
30 drinking vessel
32 outer wall of drinking vessel
34 hollow dome of drinking vessel
40 beverage liquid While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A beverage dispensing system for a vehicle, comprising:
a beverage dispenser including a nozzle having an upwardly directed nozzle tube for dispensing a beverage liquid;
a drinking vessel connectable to the nozzle tube and being fillable with the beverage liquid from a bottom side of the drinking vessel;
wherein the drinking vessel has a hollow dome, the hollow dome has a bottom side having an opening and a top side having an opening, and the hollow dome is formed by a central section of the bottom side of the drinking vessel extending into an interior of the drinking vessel;
the hollow dome is pushed onto the nozzle tube to thereby connect the drinking vessel to the nozzle tube for the drinking vessel to be filled with the beverage liquid from the bottom side of the drinking vessel;
the nozzle further includes a nozzle head on a top side of the nozzle tube; and
the nozzle head protruding above the opening of the top side of the hollow dome when the hollow dome is completely pushed onto the nozzle tube.

2. The beverage dispensing system of claim 1 wherein:
the drinking vessel is a cylindrical or truncated conical mug in which the central section of the bottom side of the drinking vessel is curved into the interior of the drinking vessel to form the hollow dome.

3. The beverage dispensing system of claim 1 wherein:
the beverage dispenser further includes a standing surface for supporting the bottom side of the drinking vessel thereon.

4. The beverage dispensing system of claim 3 wherein:
the drinking vessel is capable of sliding under its own weight into a correct filling position on the standing surface upon the hollow dome being pushed onto the nozzle tube.

5. The beverage dispensing system of claim 3 wherein:
the beverage dispenser further includes a standpipe, the standpipe extending upwardly from the standing surface; and
the nozzle tube is displaceably situated in the standpipe.

6. The beverage dispensing system of claim 5 wherein:
the standpipe extends to a level above the opening of the top side of the hollow dome.

7. The beverage dispensing system of claim 5 wherein:
an inner surface of an upper portion of the hollow dome rests liquid-tight against the standpipe whereby the beverage liquid is prevented from leaking through the opening of the top side of the hollow dome during filling of the drinking vessel with the beverage liquid.

8. The beverage dispensing system of claim 1 wherein:
the hollow dome extends at least up to one-half a height of an outer wall of the drinking vessel but does not extend to the height of the outer wall of the drinking vessel.

9. The beverage dispensing system of claim 8 wherein:
the hollow dome extends to about three-fourths the height of the outer wall of the drinking vessel.

10. The beverage dispensing system of claim 1 wherein:
the beverage dispenser further includes a pump for pumping the beverage liquid into the drinking vessel when the drinking vessel is being filled with the beverage liquid.

11. The beverage dispensing system of claim 10 wherein:
the pump is a peristaltic pump.

12. The beverage dispensing system of claim 1 wherein:
the drinking vessel is made of metal or porcelain.

13. The beverage dispensing system of claim 1 wherein:
the drinking vessel is made of cardboard or plastic.

14. The beverage dispensing system of claim 1 wherein:
the drinking vessel is fillable with the beverage liquid up to a level of the opening of the top side of the hollow dome and the beverage liquid in the drinking vessel does not reach the opening of the top side of the hollow dome even when the drinking vessel is tilted.

15. The beverage dispensing system of claim 1 wherein:
the beverage dispenser further includes a standpipe;
the nozzle tube is displaceably situated in the standpipe; and
the nozzle tube is lifted relative to the standpipe from liquid pressure of the beverage liquid upon the drinking vessel being filled with the beverage liquid whereby the nozzle head protrudes out from an opening of the standpipe and the beverage liquid may emerge out of nozzle openings of the nozzle head for the drinking vessel to be filled with the beverage liquid.

16. The beverage dispensing system of claim 15 wherein:
upon the liquid pressure of the beverage liquid being discontinued, the nozzle tube drops relative to the standpipe whereby the nozzle head closes the opening of the standpipe.

17. A beverage dispensing system for a vehicle, comprising:
- a beverage dispenser including a nozzle having an upwardly directed nozzle tube for dispensing a beverage liquid;
- a drinking vessel connectable to the nozzle tube and being fillable with the beverage liquid from a bottom side of the drinking vessel;
- wherein the drinking vessel has a hollow dome, the hollow dome has a bottom side having an opening and a top side having an opening, and the hollow dome is formed by a central section of the bottom side of the drinking vessel extending into an interior of the drinking vessel;
- the hollow dome is pushed onto the nozzle tube to thereby connect the drinking vessel to the nozzle tube for the drinking vessel to be filled with the beverage liquid from the bottom side of the drinking vessel; and
- the beverage dispenser further includes a standing surface for supporting the bottom side of the drinking vessel thereon and a standpipe extending upwardly from the standing surface, and the nozzle tube is displaceably situated in the standpipe.

18. The beverage dispensing system of claim 17 wherein: the standpipe extends to a level above the opening of the top side of the hollow dome.

19. The beverage dispensing system of claim 17 wherein: an inner surface of an upper portion of the hollow dome rests liquid-tight against the standpipe whereby the beverage liquid is prevented from leaking through the opening of the top side of the hollow dome during filling of the drinking vessel with the beverage liquid.

\* \* \* \* \*